United States Patent [19]
Williams

[11] 4,245,790
[45] Jan. 20, 1981

[54] PRESSURE RELIEF FOR MATERIAL SHREDDERS

[76] Inventor: Robert M. Williams, 16 La Hacienda, Ladue, Mo. 63124

[21] Appl. No.: 40,676

[22] Filed: May 21, 1979

[51] Int. Cl.³ .............................................. B02C 13/31
[52] U.S. Cl. .................................. 241/31; 241/186 R; 241/189 R
[58] Field of Search ................ 241/31, 186 R, 188 R, 241/188 A, 189 R, 189 A, 190, 285 R, 285 A, 285 B

[56] References Cited

U.S. PATENT DOCUMENTS

| | | | |
|---|---|---|---|
| 2,555,280 | 5/1951 | Trumbull | 241/31 X |
| 3,667,694 | 6/1972 | Williams | 241/186 R |
| 3,806,048 | 4/1974 | Williams | 241/189 A |
| 3,972,481 | 8/1976 | Naporano et al. | 241/31 X |

*Primary Examiner*—Mark Rosenbaum
*Attorney, Agent, or Firm*—Gravely, Lieder & Woodruff

[57] ABSTRACT

Pressure relief for material shredders to immediately vent pressure rise within the working spaces of a material shredder and prevent structural damage to the shredder and surrounding equipment. The pressure relief is also directed to structure for controlling rapid rise in pressure by directing the same into an area beyond the shredder where the energy in waste material of an explosive character, like gasoline cans, aerosol containers, and material that burn with explosive results can be dissipated non destructively.

9 Claims, 4 Drawing Figures

PRESSURE RELIEF FOR MATERIAL SHREDDERS

BACKGROUND OF THE INVENTION

The disposal of waste material of domestic, commercial and industrial character is an extremely troublesome area of activity. The most dangerous types of waste material encountered in shredders include: discarded cans used to contain gasoline, clean fluids and the like; various spray cans containing a propulsion medium under pressure; metallic materials that create sparks which can ignite dust; and aluminum filings (thermite) which burn without external oxygen and are explosively dangerous.

In the operation of some shredders it has been the practice at times to locate personnel adjacent the feed conveyors to scan the material and pick out the kind of waste materials noted above which can be the cause of an explosion. This is a critical area for people to occupy. Where a high volume of the waste is made up of garbage, paper, wood and items of that character which are not easily shredded if containing more than normal moisture, it has been the practice also to enclose such shredders in structures to keep the material out of rain and snow conditions. When explosions do occur, the shredder is likely to sustain severe damage and the structure surrounding it can be blown apart, with consequent chances of injury to people by flying objects.

BRIEF DESCRIPTION OF THE INVENTION

The present invention is directed to improvements in obtaining pressure relief for material shredders, and particularly the character of relief that responds quickly to pressure conditions of explosive types.

A principal object of the invention is to provide a material shredder with means that normally confines the material feed into shredders, but is capable of opening an escape route for the release of pressure before great damage is sustained, or the safety of operating personnel is imperiled.

It is another object to provide material shredders with pressure rupturable means which respond early in the generation of pressure associated with explosions but under normal operating conditions function to maintain dust and circulating material thrown out by the shredder within the shredder stack.

Other objects of the present invention are to provide shredder structure capable of releasing pressure build up before it becomes destructive, to provide a vent system that avoids changes in direction of expanding gas flow associated with explosion conditions, and to provide blow out diaphragms that are capable of retaining normal positions to hold down escape of dust and flying particles normally associated with a shredder system.

BRIEF DESCRIPTION OF THE DRAWINGS

The present invention is applicable to several forms of shredders which are disclosed in the accompanying drawings, in which.

DETAILED DESCRIPTION OF THE EMBODIMENTS

Figure 2:
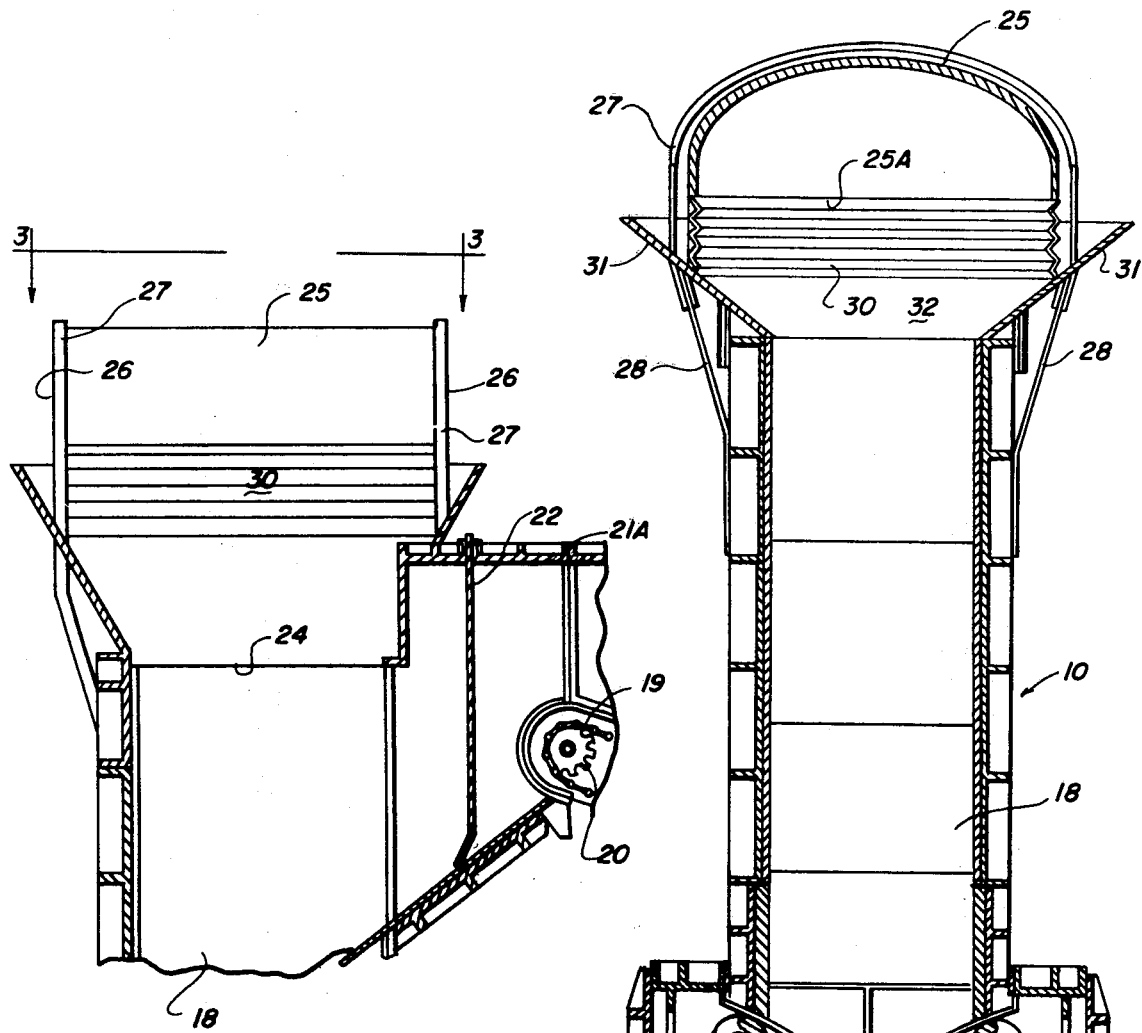
FIG. 2 is a fragmentary sectional view taken at line 2—2 in FIG. 1.
Figure 1:
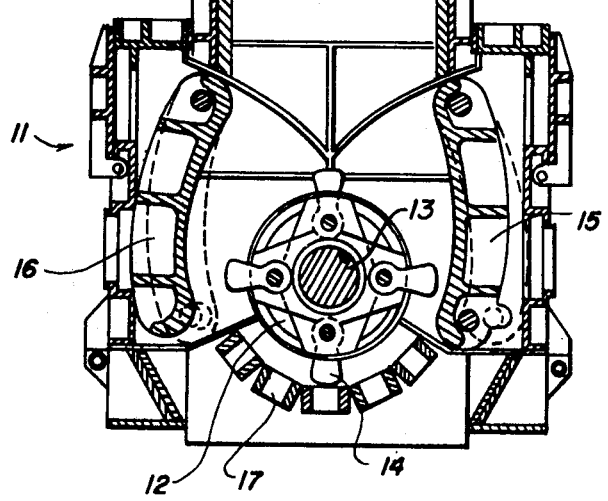
FIG. 1 is a sectional elevational view of one form of shredder showing the structure of the pressure relief means.
Figure 3:
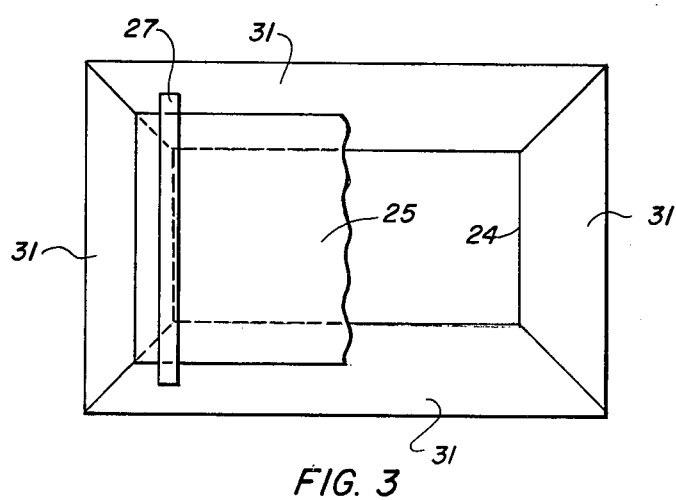
FIG. 3 is a top plan view taken along line 3—3 in FIG. 2.

Referring now to FIGS. 1, 2 and 3 the waste material shredding apparatus is shown at 10 to comprise a shredding chamber 11 in which a rotor 12 is operatively mounted to rotate on shaft 13 so that the hammers 14 carried by the rotor operate to shred material in cooperation with breaker bars 15 and 16 operatively mounted on opposite sides of the rotor 12 so as to be adjustably positioned, depending on the direction of rotation of the rotor to receive material to be reduced. The shredding chamber 11 is provided with an assembly of break bars 17 through which the shredded material can pass out of the apparatus. The shredding chamber 11 is formed with an inlet and the material feed stack 18 is connected to that inlet in the manner shown in FIG. 1. The feed stack forms an elongated column having a known cross sectional area which has a rectangular configuration extending to an open upper end.

FIG. 2 is a fragmentary disclosure showing one means for feeding waste material into the feed stack 18. In this arrangement a conveyor belt 19 has its head pulley 20 mounted so as to deliver waste material into a feed chute 21, and the feed chute is provided with a hood 21A which supports a dust curtain 22. Thus, the waste material is dropped into the feed chute 21 and passes under the curtains 22 to fall into the feed stack 18 below the open upper end 24. As seen in FIG. 3 the feed stack 18 has a rectangular cross sectional configuration in which the shorter side is perpendicular to the axis of the rotation of the rotor shaft 13, and the longer side is parallel with the shaft 13.

Referring again to FIGS. 1 and 2 there is shown the means for effecting pressure relief for pressures that may build up within the feed stack 18 and shredder chamber 11, such pressure relief means being assembled at the outer open end of the feed stack 18. The pressure relief assembly comprises an arrangement of vent means 31 surrounding the open end 24 of the feed stack 18 and flared angularly outwardly to define an area of increasing cross section opening outwardly into the ambient space. A cover 25 is supported in spaced relation from the vent means 31 by suitable columns 27 in the form of hoops which pass over the cover and act to retain the cover in place such that the peripheral margin 25A of the cover 25 is spaced from the vent means 31 to define an opening between the peripheral margin of the cover and the vent means having an effective area equal to or greater than the cross sectional area of the feed stack 18 at the open end 24 thereof. By making an escape area between the cover and the flared vent means, the rise in pressure within the feed stack does not meet with a constriction (reduction of area) in its escape path. The result is that the pressure merely blows the lightweight closure material out of the pressure relief assembly, and that material is displaced into the surrounding area to release the force of the explosion. The support columns 27 for the cover 25 may be connected to other support means 28 which also brace the vent means 31. As shown in FIG. 2 the cover 25 presents an inner surface configuration facing the feed stack 18 such that material which may be thrown out through the feed stack by the action of the hammers 14 will bounce off the surface of the cover and re-enter the feed stack. The cover 25 is closed at its opposite ends by end plates 26 so as to prevent material escaping at those ends.

The pressure relief structure above described includes releasable closure means 30 mounted between the peripheral margins 25A of the cover 25 and the adjacent surfaces of the vent means 31. The closure means can be any light-weight material such as aluminum having just sufficient rigidity to remain in place during the normal operation of the shredder apparatus, but which is releasable upon a pressure rise within the feed stack 18 and the area 32 under the cover 25, which pressure rise is slightly greater than atmospheric. For example, the closure means 30 may be designed to release at a pressure rise of one-half pound above atmospheric, but until that pressure rise occurs it should be effective to retain dust and fine particulate matter which if released could pollute the ambient area.

Figure 4:
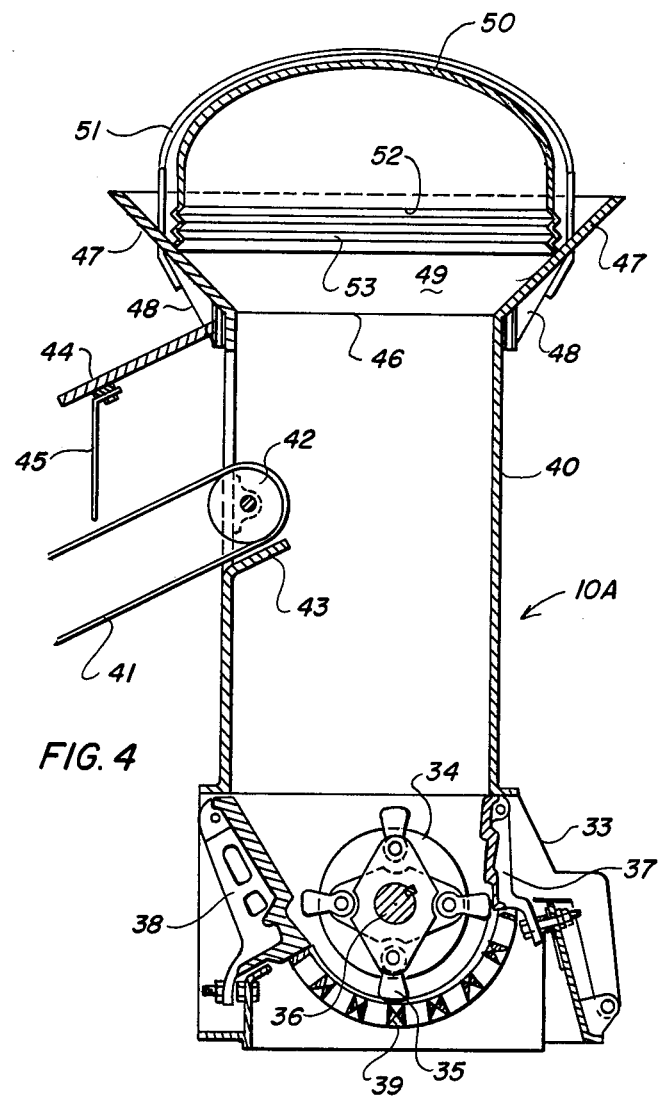
FIG. 4 is a sectional elevational view of a modified form of shredder showing the structure of the pressure relief means.

Turning now to FIG. 4 there is shown a somewhat different construction of shredding apparatus 10A which is designed to embody an over-running, or down-running or combination thereof shredder. The shredder is provided with chamber 33 in which the rotor 34 carrying hammers 35 is mounted on a shaft 36 between breaker blocks 37 and 38. The breaker blocks are positioned at different angular attitudes with respect to the path of rotation of the hammers 35 which accounts for the over-running, down-running characteristic mentioned above. The inlet to the rotor chamber 33 is associated with an elongated feed stack 40 having a conveyor 41 entering at one side as defined by the head pulley 42 mounted above a guard wall 43. The conveyor 41 passes through a hood structure 44, with the waste material passing under a dust curtain 45. The elongated feed stack 40 has an open end 46 which is surrounded by vent means 47 which are outwardly flared and supported on the feed stack by braces 48. The vent means 47 surrounds an area 49 which progressively increases in cross section as it advances away from the feed stack 40.

A cover 50 is mounted within the vent means 47 on suitable support columns 51 in the form of hoops which retain the cover 50 in position. The columns 51 are connected to the braces 48 for anchorage. The cover 50 has a peripheral margin 52 which is spaced from the inner surface of the vent means 47 to define an opening having an area which is equal to or greater than the cross sectional area of the feed stack 40 at its end 46. Releasable closure means 53 is mounted between the peripheral margin 52 of the cover 50 and the adjacent surfaces of the vent means 47 for purpose already described in connection with the assembly shown in FIGS. 1 and 2. The cover 50 may have a similar configuration to that described above for the cover 25, the purpose being to return to the feed stack 40 material that may be thrown out by the rotor hammers 35 and circulated through the feed stack 40 to bounce off the cover 50 and be returned to the feed stack.

An important consideration to be taken into account in constructing the pressure relief means for material shredders is to angularly flare the vent means 31 or 47 such that the peripheral margins 25A and 52 of the respective covers 25 and 50 are positionable beyond the tragectory of material thrown out through the feed stacks 18 or 40. This is necessary in order to prevent the releasable closure means 30 or 53 from being bombarded or pierced by such material. It has been noted previously that the closure means is made of light-weight material which is sensitive to small pressure rises above atmospheric so that it can be easily blown out to open the cross sectional areas under the covers in the event of a pressure rise associated with an impending explosion. The closure must rupture to be effective to vent the force of the explosion by having it pass out along the vent means and outside of the peripheral margin of the cover. It is important to have the vent means extend for a distance outwardly of the cover to prevent the development of a low pressure under the vent, particularly at the location of the hoods which are over the feed conveyors, because a rapid decrease in pressure at the respective hoods can lift or displace the hoods and thereby damage the feed conveyor structure associated with the shredder apparatus.

The present pressure relief for material shredders possesses the ability to release a rise in pressure associated with an explosion without significantly changing the direction of the expanding gases. This is accomplished by providing the releasable closure or rupturable diaphragm above described which is constructed of material capable of being blown out at a pressure rise of approximately one-half pound per square inch. The position of the closure means is such that it is normally out of the trajectory of material thrown out through the feed stack but effective to prevent dust from escaping to the surrounding atmosphere. Experience has shown that when the feed stack is provided with a fixed cover directly attached to the open end of the feed stack it acts to compress the gases associated with an explosion. Any containment of the expanding gases results in rupturing the structure of the cover and the feed stack. When heavy metallic cover and parts of the associated structure are blown out by the explosive force they become dangerous projectiles. The present pressure relief for material shredders acts to open up the feed stack and direct the explosive force along a path and under controlled conditions to minimize the chances of damaging the shredder structure and housing structures that may be required when the waste material needs to be protected from weather conditions as pointed out above.

What is claimed is:

1. In a material reducing shredder providing an open top material feed stack having a known cross-sectional area with material feeding conveyor means connected into the feed stack above the bottom and material shredding rotor means adjacent the bottom of the feed stack, the improvement therein which comprises: vent means surrounding said open top of said feed stack, a cover for said open top feed stack, said cover having a bottom edge presented toward said vent means, support means between said cover and stack spacing said cover from said vent means and over said feed stack open top for providing an opening to the exterior between said cover bottom edge and the top of said stack having an area equal to or greater than said known cross-sectional area of the feed stack; and rupturable closure means normally in position to close the opening between said cover bottom edge and said vent means surrounding the top of the stack.

2. The improvement set forth in claim 1, wherein said cover is formed with a material rebound surface bounded by a rim which extends beyond the cross sectional area of the feed stack whereby material thrown out into the feed stack may ricochet within the bounding rim of said cover and return toward the shredding rotor means.

3. The improvement set forth in claim 1, wherein vent means adjacent the open top of said feed stack extend angularly outwardly to surround a portion, at least, of said cover in spaced relation therefrom.

4. The improvement set forth in claim 3, wherein said closure means extends between said cover and said vent means.

5. The improvement set forth in claim 1, wherein said closure means is releasably engaged between said cover and stack whereby upon pressure rise in the feed stack said closure means will release and open the area for relief of the pressure.

6. In waste material shredding apparatus including an elongated waste material receiving stack of predetermined cross-sectional area, a cover adjacent one end, and waste material shredding means adjacent the opposite end, the improvement which comprises: means supporting said cover in spaced relation from said one end of said stack, said cover having a periphery presented toward, and surrounding said stack and defining a cross-sectional area at least equal to the cross-sectional area of said stack to provide an opening under said cover presented to the surrounding ambient area from said stack, and rupturable closure means closing said opening, said closure means rupturing in response to a pressure rise in said stack.

7. The improvement set forth in claim 6, wherein said rupturable means is positioned to be beyond said one end of the stack.

8. The improvement set forth in claim 6, wherein said means supporting said cover includes vent means angularly flared relative to said one end of the stack and extending outwardly of said cover.

9. Waste material shredding apparatus comprising: a waste material shredding chamber having an inlet for waste material and an outlet for the shredded material; a waste material feed stack forming an elongated column having a known cross sectional area, said column being connected to said chamber inlet and extending to an open outer end; conveyor means connected into said feed stack for delivering waste material into said feed stack; vent means connected to said feed stack outer open end, said vent means being angularly outwardly flared to define an area within said vent means equal to or greater than the known cross sectional area of said feed stack; a cover supported in spaced relation from said vent means and being over said open outer end of said feed stack and having a peripheral margin spaced from said vent means and an inner surface configuration presented to said open outer end of said feed stack for redirecting material into said feed stack thrown out of said shredding chamber; and releasable closure means mounted in the space between said cover peripheral margin and said vent means, said closure means releasing to open said space upon a pressure rise in said feed stack greater than atmospheric.

* * * * *